Sept. 16, 1958
R. J. VIALE
2,852,655
GAS SAVING DEVICE
Filed Aug. 15, 1955
2 Sheets-Sheet 1
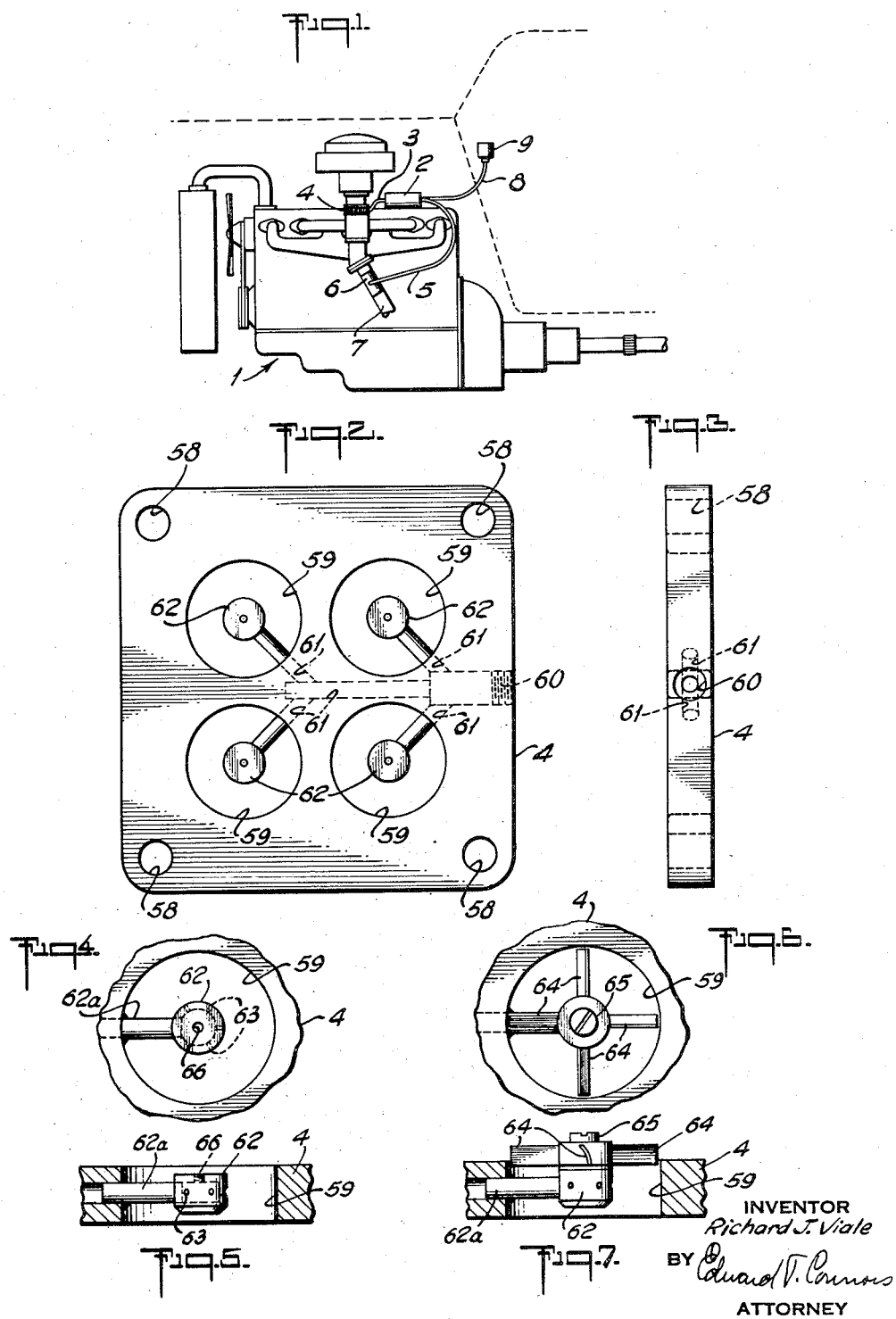
INVENTOR
Richard J. Viale
BY Edward T. Connors
ATTORNEY Sept. 16, 1958

R. J. VIALE 2,852,655

GAS SAVING DEVICE

Filed Aug. 15, 1955

INVENTOR
Richard J. Viale
BY Edward T. Connors
ATTORNEY

United States Patent Office 2,852,655
Patented Sept. 16, 1958

2,852,655

GAS SAVING DEVICE

Richard J. Viale, Ridgefield Park, N. J., assignor, by mesne assignments, to Thomas A. Brunei, Upper Montclair, N. J., doing business as Bru Research Institute Application August 15, 1955, Serial No. 528,318

2 Claims. (Cl. 219—38)

The present invention relates to gasoline engines and particularly to a device for increasing the efficiency thereof.

In gasoline engines the efficiency depends to a great extent upon a good mixture of the air with the gasoline for the combustion thereof. The gasoline is vaporized and mixed with the air more readily at higher temperatures. However, an excess in temperature may result in expansion of the air to a point which may result in lowered efficiency because of the high volume of the heated air.

I have found that the greatest efficiency is obtained by heating the mixture of air and gasoline immediately after these materials have been mixed in the carburetor. Because the air is mixed with the gasoline in practically liquid form, the latent heat of evaporation of the gasoline results in a lowering of the temperature of the mixture, thus tending to reduce somewhat the vaporization of the gasoline. I have found that if the mixture is heated immediately after emerging from the throat of the carburetor, a better vaporization is obtained, and, by reason of the passage of the mixture through the manifold with resultant turbulence, a homogeneous mixture is delivered to the cylinders of the gasoline engine, thereby providing a higher efficiency.

Various means might be utilized for heating the mixture, but it is of great importance that the temperature be controlled within limits inasmuch as if an excess of heat is applied, the engine operates roughly and the efficiency drops off, while, of course, if insufficient heat is provided, although the engine may operate smoothly, there is no gain in efficiency.

Various means have been utilized for heating the gasoline mixture such as by applying heated jackets to the carburetor or intake manifold. However, such devices have been cumbersome and expensive and have been ineffective probably because of the lack of proper control of the heat.

An object of the present invention is to provide a device which will improve the efficiency of a gasoline engine.

Another object of the present invention is to provide a device which will increase the efficiency of a gasoline engine by heating the gasoline-air mixture at a point immediately after the mixture has passed the carburetor.

Another object of the present invention is the provision of a device including controlling means for the heating of the vaporized mixture.

Another object of the invention is the provision of a device for increasing the efficiency of a gasoline engine which is simple in manufacture, efficient in operation and durable in use.

In accordance with the invention a device is provided for delivering heated air into the intake manifold of the engine immediately after the carburetor.

The device is advantageous in that it may be easily applied to already manufactured gasoline engines as well as incorporated in the engine during the original manufacture thereof.

Other objects and advantages of the invention will be apparent from the following description and from the accompanying drawings which show, by way of example, an embodiment of the invention.

In the drawings, Figure 1 is a side view of a gasoline engine having attached thereto a device in accordance with the invention.

Figure 2 is a top view of the intake manifold plate of the device in accordance with the invention.

Figure 3 is a side view of the plate shown in Figure 2.

Figure 4 is a detailed top view of the dome positioned in the plate.

Figure 5 is a detailed side view of the dome shown in Figure 4.

Figure 6 is a top view of a mixing propeller which may be alternatively used in conjunction with the dome shown in Figures 4 and 5.

Figure 7 is a side view showing the propeller in position over the dome.

Figure 8:
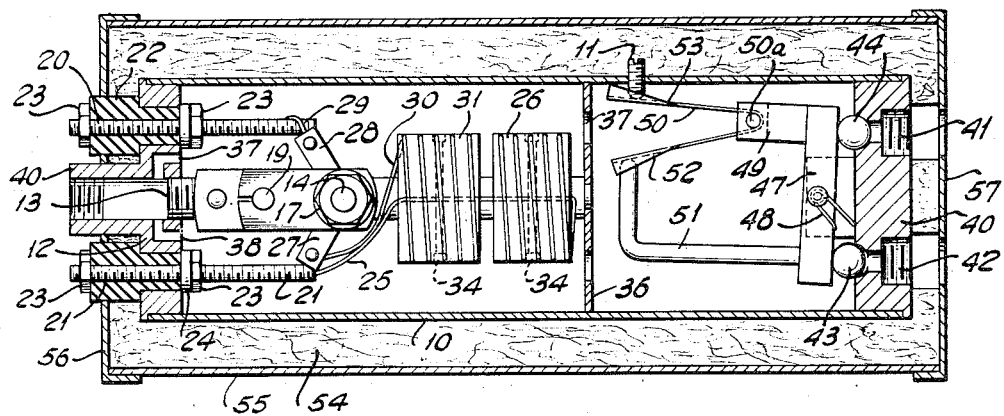
Figure 8 is a detailed sectional view of the main chamber of the device including and showing the electrical heating elements in side view.

Referring to the drawings, there is shown in Figure 1 a gasoline engine 1 having attached thereto a device in accordance with the invention including a main chamber 2, a main chamber outlet pipe 3, an intake manifold plate 4, a main chamber air intake 5 leading from a hot air collector adjacent the exhaust manifold 7 and an auxiliary main chamber air intake pipe 8 connecting from an air filter 9.

Figure 9:
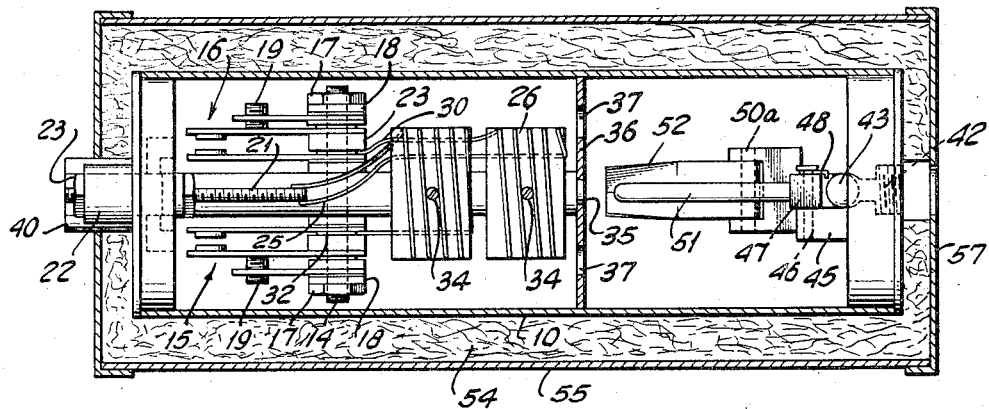
Figure 9 is a view corresponding to Figure 8 taken at an angle of approximately 90° thereto.

The main chamber 2 shown in detail in Figures 8 and 9 includes a tubular member 10 which may be made of seamless stainless steel tubing or any other suitable material. The diameter of the tubing may range from about 1¼ inches to 2½ inches, preferably 1¾ inches, outside diameter. The wall of the tubular member is preferably about $\frac{1}{16}$ inch in thickness. The wall of the tubular member 10 is drilled and tapped to receive an adjusting screw 11 on the side wall thereof for a purpose which will later be described.

A heater and thermostat assembly is provided to be mounted within the tubular member 10 and includes a cap or end plate 12 supporting a shaft 13 which is drilled transversely to receive a screw 14 holding thermostats 15 and 16 on opposite sides of the shaft 13. The thermostats 15 and 16 may be any suitable commercial type preferably incorporating the bimetallic principle and are preferably such as to have a contact opening range between 155° and 165° F. and preferably at 160° F. The thermostats are apertured to slide over the screw 14 and are held in position thereon by nuts 17 abutting against washers 18. The thermostats are provided with adjusting screws 19 which may be turned to provide the desired closing range for the thermostat which is preferably about five degrees below the opening range.

The cap or end plate 12 is apertured to receive electric terminals 20 and 21 which are insulated by phenyl-fiber bushings 22. Other suitable materials may be used for the insulating bushings 22. The electrical terminals 20 and 21 may be made of screws having a threaded exterior surface to receive nuts 23, the inner nuts 23 being insulated by mica washers 24.

Terminal 21 is adapted to be connected to the electrical supply or battery of the gasoline engine preferably through the ignition switch or by other conventional means not shown. The terminal 21 as shown in Figures 8 and 9 is connected to a Nichrome wire 25 which is part of one electrical heating resistor wound around a porcelain spool 26, the Nichrome wire 25 terminating at a terminal 27 of the thermostat 16. The other terminal 28 of the thermostat 16 is connected by a wire 29 to the terminal 20.

The terminal 21 is also connected by a Nichrome wire 30 which is part of another electric heating resistor wound on a second porcelain spool 31, the other end of the Nichrome wire 30 being connected to a terminal 32 of the thermostat 15. The other terminal of the thermostat 15 is connected to the terminal 20, this connection not being shown in the drawing as it would be on the back side of Figure 9 or the under side of Figure 8, but may be made at the same point as is the wire 29. The porcelain spools 26 and 31 are mounted on the shaft 13 by being slipped thereover and held in position by screws 34 extending through apertures in the shaft 13. The porcelain spools are thus firmly held against axial or rotative movement on the shaft 13. The surface of the porcelain spools 26 and 31 are preferably formed with grooves to receive the Nichrome wire to hold the convolutions thereof spaced in insulating relationship.

The inner end of the shaft 13 is threaded as indicated at 35 to carry an apertured baffle member 36 provided with a plurality of openings 37. The baffle member acts as a support for the inner end of the shaft 13 so that the thermostats and electrical heaters are rigidly held in position, and also is effective to provide better mixing for the air entering from the air intake pipes 5 and/or 8.

The cap member or intake 12 is drilled to provide outlet passages 37 and 38 to the interior of a hollow boss 40 threaded to receive the outlet pipe 3.

At the other end of the tubular member 10 is a valve chamber closed by an end plate 40 fitted with threaded inlets 41 and 42 and adapted to be closed at their inner ends by ball check valves 43 and 44. As it is desirable that one or the other of the ball check valves remain closed, thermostatic means is provided normally holding the check valve 43 closed leading to the auxiliary air pipe 8 and opening the check valve 44 to the pipe 5 leading to the hot air collector 6.

In order to support the thermostatic means there is provided a pivot block 45 apertured and carrying a pin 46 on which is pivotally mounted a valve-operating bar 47. A spring 48 tends to urge the valve-operating bar 47 in the position to allow ball check member 43 to assume an unseated position.

At one end of the valve-operating bar 47 is a yoke block 49 carrying at its outer end a generally U-shaped bi-metallic thermostat 50 secured by a pin 50ª. The thermostat 50 is provided to operate at approximately the same temperature range as thermostats 15 and 16, that is to open check valve 44 at a temperature ranging between 155° and 165° F., and to close valve 44 at approximately five degrees lower. At the other end of the valve-operating bar 47 is a generally L-shaped extension 51 having its upper end turned upwardly to be contacted by leg 52 of the bi-metallic thermostat. Other leg 53 of the bi-metallic thermostat 50 is adapted to contact the end of adjusting screw 11 which may be turned to provide the desired operation of the thermostat so that the check valves 43 and 44 may be operated as will be explained later.

The tubular member 10 is surrounded by insulating material 54 which is held in position by an outer shell 55 having end plates 56 and 57 to retain the insulating material 54 in position.

The intake manifold plate shown in Figures 2 and 3 is preferably made of steel but any suitable material may be used. The design of the manifold plate 4 may be varied to some extent depending upon the dimensions of the carburetor and intake pipe with which the gas saving device is to be used. In some instances the device may be used with single barrelled carburetors, in other cases, with double or four barrelled carburetors, in which event the design of the manifold plate must be such that the plate may be positioned between the carburetor and the manifold plate and provide the proper passage for the gas-air mixture. For this reason, mounting holes 58 are shown as provided at the corners of the manifold plate, and the plate 4 is shown provided with four openings 59 to conform to the present carburetor construction. The plate 4 is drilled and threaded as indicated at 60 to receive the end of the main chamber outlet pipe 3 which is preferably insulated so as to reduce heat loss. The manifold plate is drilled as indicated at 61 to provide distribution passages for the heated air to the openings 59.

In order that the heated air may be applied to the point of its greatest effectiveness in the gasoline-air mixture, a dome member 62 is provided for each of the openings 59. The dome member 61 is provided with a plurality of discharge openings 63 positioned around the sides thereof so as to equally distribute the heated air in a radial manner from the dome member into the stream of gasoline-air mixture, and is supported by a short section of tubing 62ª which is inserted in the end of a passage 61 and secured by silver solder or other conventional means.

In order to provide an improved mixture, propellers 64 may be pivotally mounted on pins 65 engaged in openings 66 on the top of the dome member 62.

In order to provide air at lower temperatures for the main chamber, one inlet to the main air chamber is connected to the auxiliary air intake pipe 8 and is directed to a suitable location remote from the heat of the engine and fitted with an air filter 9 so that cool air may be drawn into the main air chamber. In order to provide air at higher temperatures for the main air chamber, the other inlet to the main air chamber is connected by the air intake pipe 5 to a hot air collector 6 of any conventional type positioned in proximity to the exhaust pipe as may be seen in Figure 1 so that heated air may be drawn into the collector 6.

In the operation of the device, the various thermostats are factory adjusted and the device inserted in position by removing the carburetor and inserting the manifold plate 4 against the end of the engine intake pipe and the carburetor is replaced in position. The piping is completed as shown in the drawings.

Upon starting the engine the ignition switch is turned to the "on" energizing one or both of the thermostats 15 and 16. The rotation of the motor provides suction in the intake manifold which draws air through the main air chamber 2. Depending upon temperature conditions, one of the check valves 43 or 44 is closed by the action of the thermostat 50. Under normal operations, the check valve 44 will be normally open so as to permit heated air from the exhaust pipe to be drawn through the hot air collector 6. The check valve 44 is generally in the open position because the temperature is generally such as to cause the bi-metallic thermostat 50 to spread, thereby moving the L-shaped extension 51 downwardly so as to pivot the valve-operating bar 47 urging the ball check 43 against its seat and releasing pressure on the ball check 44 so that it may open under the inward flow of air from the vicinity of the exhaust pipe.

As the temperature of the incoming air through the pipe 5 increases, the bi-metallic thermostat 50 may close the check valve 44 and open the check valve 43 so that cooler air may be drawn in through the air intake pipe 8. After the air has passed through the openings 37 in the baffle plate 36, it is further warmed, if necessary, by the electrical resistors on the spools 46 and 31. The heated air then passes the thermostats 15 and 16 through the passages 37 and 38 and the insulated pipe 3 and the dome members 62 into the inlet manifold to heat the air-gasoline mixture and assure complete vaporization of the gasoline. After the temperature of the air in the vicinity of the thermostats 15 and 16 has reached the desired temperature, one or both of the thermostats open so as to de-energize the heating resistors and the air passes through the main chamber without further heating.

While the invention has been described and illustrated with reference to a specific embodiment thereof, it will be understood that other embodiments may be resorted to without departing from the invention. Therefore, the form of the invention set out above should be considered as illustrative and not as limiting the scope of the following claims.

I claim:

1. A device for heating air to be applied between the carburetor and the intake manifold of a gasoline engine for increasing the efficiency thereof comprising a hollow tubular member, end plates for the tubular member, an inlet in one end plate, an outlet in the other end plate, an apertured baffle member separating the tubular member into two chambers, a thermostatically operated inlet valve in one chamber, an electrical heating element within the tubular member in the other chamber, and a thermostat within the tubular member within the other chamber to control the electrical heating element, whereby the air to be introduced into the manifold may be heated to a predetermined value.

2. A device for heating air to be applied between the carburetor and the intake manifold of a gasoline engine for increasing the efficiency thereof comprising a tubular member, end plates for the tubular member, one of the end plates having dual inlets, an inlet valve member for each inlet, the other of the end plates having an outlet, a stud extending inwardly from said other end plate, a pair of thermostats carried by the stud, a pair of electrical resistance wire spools carried by the stud, a pair of electrical resistances each wound on one of said spools and electrically connected with a thermostat, an apertured baffle member carried by the stud at its inner end, a pivotal valve operating member operative to alternatively hold one of the inlet valve members in the closed position, spring means normally tending to move the operating member in one inlet valve closing position, and an inlet valve thermostat operative to urge the valve operating member in opposition to said spring means to move the other of said inlet valves into the closed position whereby the air to be introduced into the manifold may be heated to a predetermined value.

References Cited in the file of this patent

UNITED STATES PATENTS

| | | |
|---|---|---|
| 1,246,820 | Milligan | Nov. 13, 1917 |
| 1,269,689 | Donning | June 18, 1918 |
| 1,293,041 | Coleman | Feb. 4, 1919 |
| 1,306,987 | Wilson | June 17, 1919 |
| 1,406,113 | Van Voorhis | Feb. 7, 1922 |
| 1,424,567 | Higgins | Aug. 1, 1922 |
| 1,580,834 | McClelland | Apr. 13, 1926 |
| 1,584,245 | Robinson | May 11, 1926 |
| 2,093,918 | Lord | Sept. 21, 1937 |
| 2,610,282 | Brownell | Sept. 9, 1952 |